United States Patent [19]
Tanaka et al.

[11] Patent Number: 5,825,761
[45] Date of Patent: Oct. 20, 1998

[54] RADIO COMMUNICATION EQUIPMENT WITH TRANSMISSION RATE REGULATING FUNCTION

[75] Inventors: Masahiko Tanaka; Kenji Okita, both of Tokyo, Japan

[73] Assignee: NEC Corporation, Tokyo, Japan

[21] Appl. No.: 685,664

[22] Filed: Jul. 24, 1996

[30] Foreign Application Priority Data

Jul. 26, 1995 [JP] Japan ...................................... 7-190308

[51] Int. Cl.$^6$ ...................................................... H04J 3/22
[52] U.S. Cl. ............................................ 370/333; 375/225
[58] Field of Search ..................................... 370/252, 251, 370/337, 248, 247, 358, 391; 455/67.1, 38.3, 50.1, 51.1, 52.1, 423, 501, 522, 63, 66, 67.3, 67.4; 375/227, 226, 225, 267, 367

[56] References Cited

U.S. PATENT DOCUMENTS 5,623,518  4/1997  Pfiffner ...................................... 375/238

FOREIGN PATENT DOCUMENTS

| 0565230 | 10/1993 | European Pat. Off. . |
| 218269 | 9/1986 | Japan . |
| 289324 | 11/1989 | Japan . |
| 090664 | 3/1992 | Japan . |
| WO9222162 | 12/1992 | WIPO . |

*Primary Examiner*—Dang Ton
*Attorney, Agent, or Firm*—Sughrue, Mion, Zinn, Macpeak & Seas, PLLC

[57] ABSTRACT

An RSSI detector 2 detects the electric field level of a received signal, and a transmission rate determiner 5 determines an initial transmission rate value from the detected electric field level. A radio unit 1 transmits the determined initial value to a base station 20. In response thereto, the base station 20 transmits a control signal at the assigned initial transmission rate value. A bit error rate value detector 4 detects a bit error rate of the control signal, and a transmission rate determiner 5 finely regulates the initial value according to the detected bit error rate. An optimal transmission rate is thus determined.

15 Claims, 3 Drawing Sheets

| RSSI LEVEL | INITIAL VALUE B |
|---|---|
| x < R1 | 1200 |
| R1 ≤ x < R2 | 2400 |
| R2 ≤ x < R3 | 4800 |
| R3 ≤ x | 9600 |

FIG.3

RADIO COMMUNICATION EQUIPMENT WITH TRANSMISSION RATE REGULATING FUNCTION

BACKGROUND OF THE INVENTION

1. Field of the Invention

The present invention relates to a radio communication equipment and, particularly, to a radio communication equipment with a transmission rate regulating function.

2. Description of the Related Art

A private communication equipment such as portable telephone set and a peripheral device thereof tend to become compact to improve the portability thereof and to make it possible to communicate even when a user of the communication equipment is moving at high speed on a vehicle such as a car or a train.

In a case of a communication through a communication equipment which is moving at high speed, however, the influence of fading becomes considerable and so the level variation of electric field is considerable. Therefore, the transmission error rate is increased and the data transmission becomes difficult.

In a facsimile equipment utilizing a radio channel, it is possible to change a transmission rate of data signal according to a receiving level of electro-magnetic wave incoming from the other end of communication in such a way that the transmission rate is lowered from an initial value of transmission rate, which is set to the maximum transmission rate, when the receiving level is changed. Such facsimile equipment is disclosed in, for example, Japanese Patent Application Laid-open No. H4-90664 (JP-A-4-90664). On the other hand, in a facsimile equipment utilizing a cable, an optimal transmission rate is determined by calculating an S/N ratio of the channel on the basis of a receiving signal level for checking a channel quality and a noise level during a non-signal period. Such cable facsimile equipment is disclosed in, for example, Japanese Patent Application Laid-open No. S61-218269 (JP-A-61-218269).

Further, in a radio wave data transmission system, a center station changes a transmission rate by detecting a quality of a radio channel on the basis of a signal strength of a request signal from a sub-station. Such radio channel data transmission system is disclosed in, for example, Japanese Patent Application Laid-open No. H1-289324 (JP-A-1-289324).

However, in the above-mentioned prior art in which the receiving electric field level is detected, there may be data error occurred due to the influence of fading. Further, in the above-mentioned prior art in which the S/N ratio is calculated, a reference value for the receiving signal level becomes unstable due to the influence of fading on the transmission channel.

SUMMARY OF THE INVENTION

An object of the present invention is to provide an improved radio communication equipment with a transmission rate regulating function.

Another object of the present invention is to provide a radio communication equipment with a transmission rate regulating function, in which an optimal transmission rate is detected on the basis of a receiving electric field strength and a bit error rate.

In one aspect of the present invention, a radio communication equipment with a transmission rate regulating function comprises a detector for detecting a receiving electric field level of a radio signal from the other station of communication, a transmission rate determining portion for assigning a transmission rate of a control signal from the other station according to the receiving electric field level detected by the detector, a control portion and a bit error rate detecting portion for detecting a bit error rate, wherein the transmission rate determining portion determines an optimal transmission rate by regulating the assigned transmission rate according to the bit error rate detected by the bit error detecting portion.

It is preferable that the control portion assigns the transmission rate determined by the transmission rate determining portion to the other station.

It is preferable that the detector determines the receiving electric field level on the basis of a voltage value of the received signal.

It is preferable that the bit error rate detector portion detects the bit error rate by using a frame sync data of the control signal.

In another aspect of the present invention, a radio communication equipment with a transmission rate regulating function comprises a receiving portion for receiving a signal from the other station of communication, a receiving electric field level detector for detecting a receiving electric field level of the signal received by the receiving portion, a bit error rate detector for detecting a bit error rate of the signal received by the receiving portion and a transmission rate determining portion for setting an initial value of transmission rate according to the receiving electric field level detected by the receiving electric field level detector and determining an optimal transmission rate by regulating the initial value according to the bit error rate detected by the bit error rate detector.

It is preferable that the bit error rate detector detects a bit error rate from a signal received after the initial value of transmission rate is determined by the transmission rate determining portion.

Further, it is preferable that the communication equipment further comprises a data terminal portion which has a user interface function and manages a data storage and a modem portion for modulating and demodulating data communicated with the other station.

In another aspect of the present invention, a control method for regulating the signal transmission rate of the radio communication equipment is provided, which comprises the steps of detecting a receiving electric field level of a radio signal from the other station, assigning a transmission rate of a control signal from the other station according to the detected receiving electric field level, detecting a bit error rate of the control signal and determining an optimal transmission rate by regulating the assigned transmission rate according to the detected bit error rate.

In a further aspect of the present invention, a control method for regulating the signal transmission rate of the radio communication equipment is provided, which comprises the steps of receiving a signal from the other station, detecting a receiving electric field level of the received signal, detecting a bit error rate of the received signal, setting an initial value of the transmission rate according to the detected receiving electric field level and determining an optimal transmission rate by regulating the initial value according to the detected bit error rate.

BRIEF DESCRIPTION OF THE DRAWINGS

These and other objects, features and advantages of the present invention will become more fully apparent from the following detailed description taken with the accompanying drawings in which:

FIG. 3 is a table showing a relation between a receiving electric field level and a transmission rate.

In the drawings, the same reference numerals denote the same structural elements.

DESCRIPTION OF THE PREFERRED EMBODIMENTS

Figure 1:
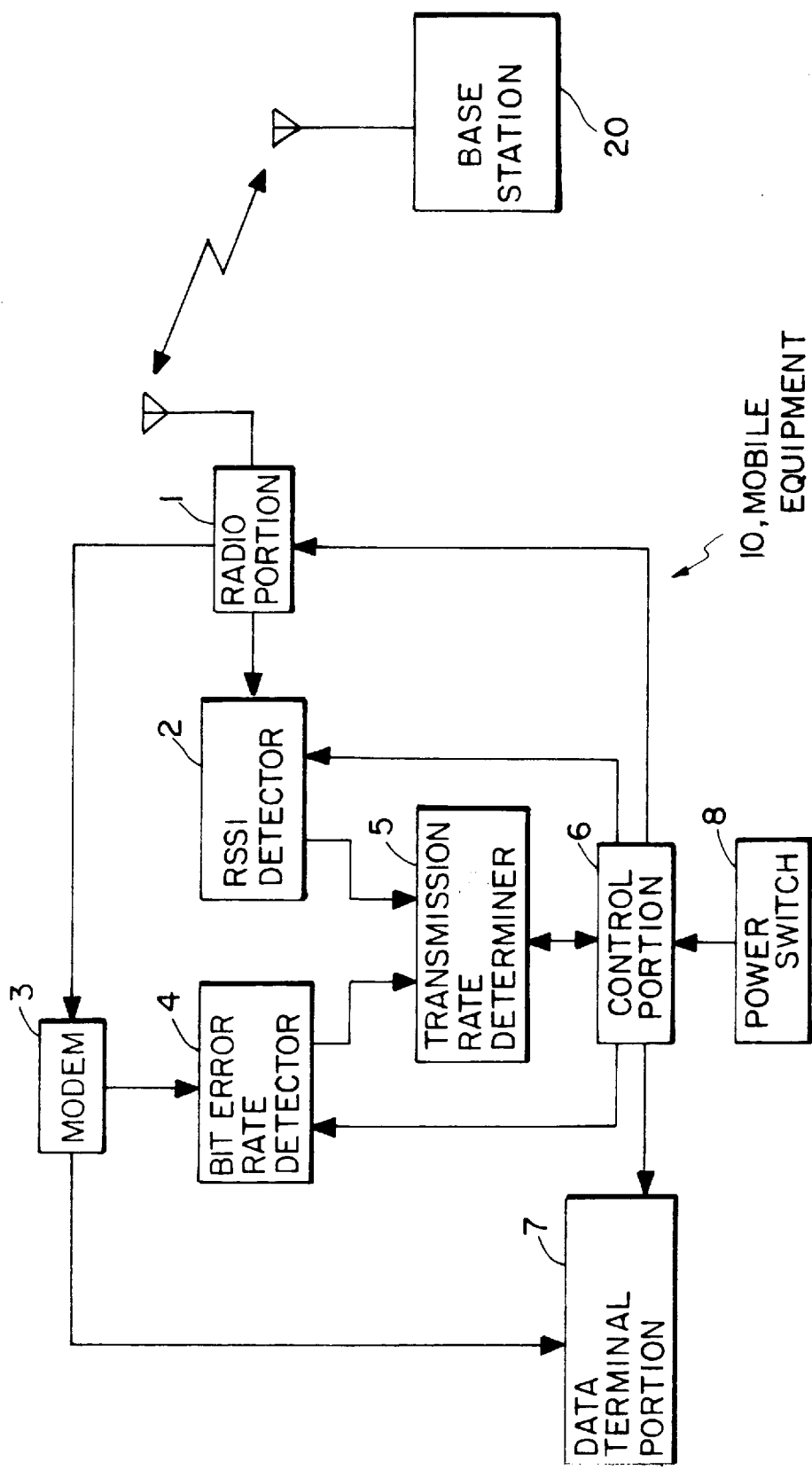
FIG. 1 is a block diagram showing an embodiment of the present invention.

FIG. 1 is a block diagram of a mobile radio communication equipment according to the present invention.

In FIG. 1, a mobile radio communication equipment 10 is constructed with a radio portion 1, an RSSI (Received signal Strength Indication) detector 2, a modem 3, a bit error rate detector 4, a transmission rate determiner 5, a control portion 6, a data terminal portion 7, a power switch 8 and a power source 9.

The radio portion 1 of the mobile radio communication equipment 10 has an interface function for an infra radio station and transmits/receives a signal to/from a base station 20. The RSSI detector 2 receives a radio signal transmitted continuously by the base station 20 and received by the radio portion 1 and detects a receiving electric field level of the radio signal. The receiving electric field level thus detected is converted into a voltage value and an RSSI level which becomes a reference for an initial value of transmission rate.

The modem 3 modulates and demodulates a communication data. The bit error rate detector 4 detects a bit error rate for finely regulating the transmission rate on the basis of a frame sync data from the modem 3. The frame sync data is inserted into a header portion of a control signal from the base station 20.

The transmission rate determiner 5 sets the initial value of the transmission rate on the basis of the RSSI level from the RSSI detector 2 and determines an optical transmission rate by finely regulating the initial value on the basis of the bit error rate from the bit error rate detector 4. The control portion 6 controls operations of various portions of the mobile radio communication equipment 10. The data terminal portion 7 has a user interface function and manages data storage. The power switch 8 is adapted to be manually on/off operated by a user to connect the power source 9 to the various portions.

Figure 2:
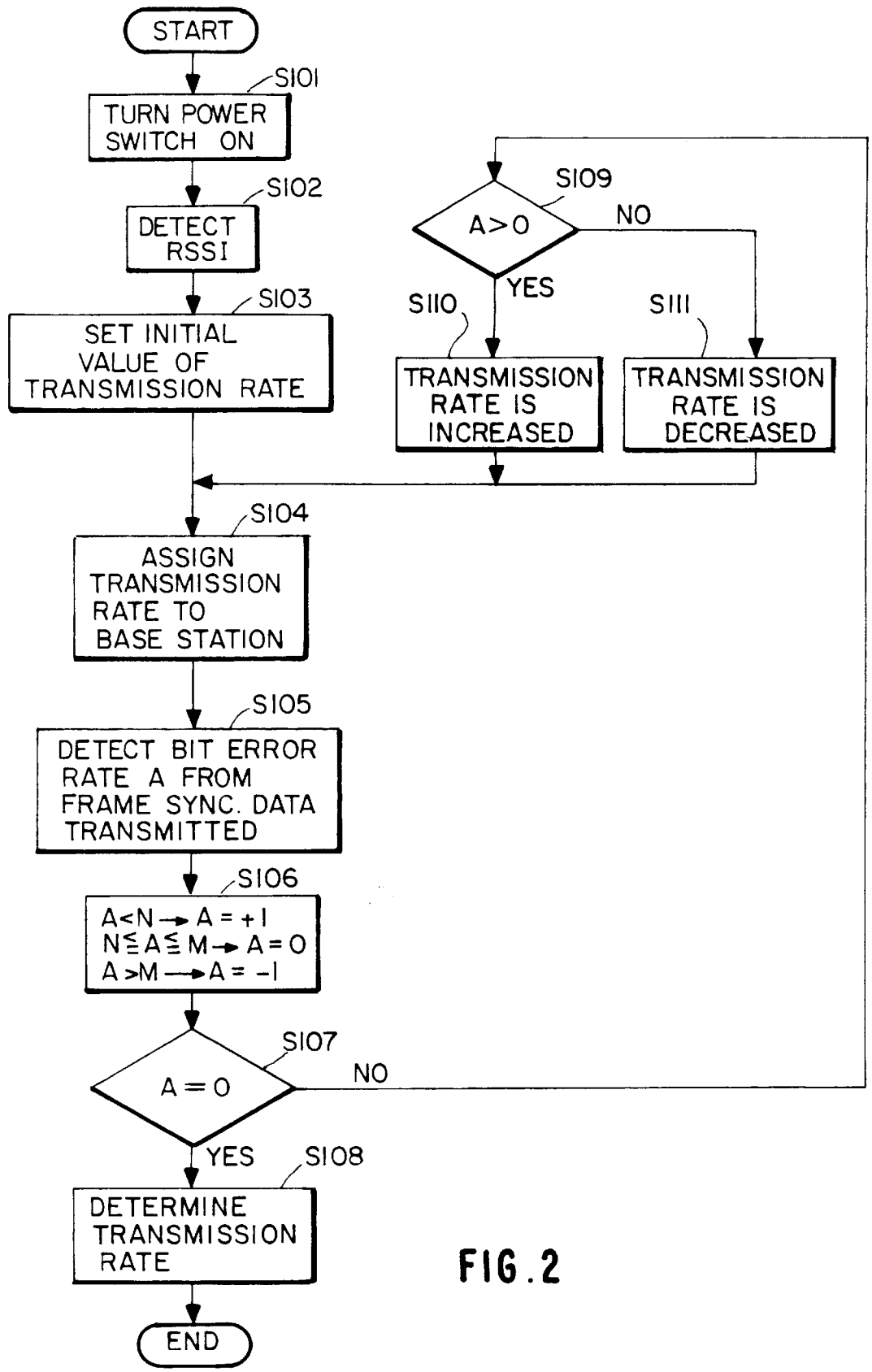
FIG. 2 is a flowchart of an operation of the embodiment shown in FIG. 1.

Now, an operation of the mobile radio communication equipment 10 shown in FIG. 1 will be described with reference to the flowchart shown in FIG. 2.

When the power switch 8 is turned on (step S101), the control portion 6 detects it and supplies the power source voltage to the radio portion 1. In response thereto, a receiving circuit of the radio portion 1 is started to receive a radio signal which has a predetermined frequency and transmitted continuously at a predetermined transmission rate by the base station 20. The RSSI detector 2 detects the receiving electric field level of the radio signal received by the radio portion 1 and detects the RSSI level by converting the receiving electric field level into a voltage value (step S102). The transmission rate determiner 5 determines an initial value B of the data transmission rate on the basis of the RSSI from the RSSI detector 5 (step S103).

FIG. 3 shows a preferable relation between the RSSI level and the initial value B of transmission rate. In FIG. 3, the detected RSSI level x is compared with predetermined RSSI levels R1, R2 and R3, respectively, where R1<R2<R3. When the detected RSSI level x is lower than the predetermined first value R1, the initial value B of transmission rate is set to 1200 bps. When the detected RSSI level x is not lower than the predetermined second value R2 and is lower than the third value R3, the initial value B is set to 4800 bps. When the detected RSSI level x is not lower than the third value R3, the initial value B of transmission rate is set to 9600 bps.

The control portion 6 responds to the initial value B of transmission rate determined in the step S103 to request the radio portion 1 to transmit a transmission rate assigning signal to the base station 20. The radio portion 1 transmits the transmission rate assigning signal instructing a communication at the initial value B of transmission rate to the base station 20 upon the request from the control portion 6 (step S104). When, for example, the detected RSSI level x is lower than the first level R1, the transmission rate assigning signal instructing a transmission at the initial value 9600 bps is sent to the base station 20.

In response to the transmission rate assigning signal, the base station 20 sends the control signal including the frame sync data to the mobile radio communication equipment 10. The frame sync data received by the radio portion 1 is supplied through the modem 3 to the bit error rate detector 4. The bit error rate detector 4 detects a bit error rate A of the frame sync data (step S105) and ranks the detected bit error rate (step S106).

The detected bit error rate y is compared with predetermined first and second threshold values N and M, respectively, where N<M). It is preferable that the bit error rate is in the order of 1%. For example, the threshold values N and M are 0.5% and 1.2%, respectively. When the detected bit error rate y is smaller than the first threshold value N=0.5%, the bit error rate A is ranked as "+1". When the detected bit error rate y is not smaller than the first threshold value N=0.5% and is not larger than the second threshold value M=1.2%, the bit error rate A is ranked as "0". When the detected bit error rate y is larger than the second threshold value M=1.2%, the bit error rate A is ranked as "−1".

When the rank of the bit error rate A is 0 after the ranking operation in the step S106 (YES in step S107), it is determined that the initially set transmission rate is appropriate and the transmission of data is started at the initial value B of transmission rate (step S108).

When the rank in the step S107 is not 0 (NO in step S107), it is determined whether the rank is larger than 0 (step S109). That is, when the transmission rate is not appropriate, it is determined whether the transmission rate is higher or lower than the appropriate value. When the rank is larger than 0, that is, the transmission rate is determined as lower, transmission rate is increased and a new transmission rate is set (step S110). On the other hand, when it is determined that the rank is smaller than 0, that is, the transmission rate is higher, the transmission rate is decreased and another new transmission rate is newly set (step S111).

For example, when an initial transmission rate is 4800 bps and the bit error rate A is ranked as "H", new transmission rate 9600 bps is set. On the other hand, the initial transmission rate is 4800 bps and the bit error rate A is ranked as "−1", new transmission rate 2400 bps is set.

When such new transmission rate is set, the control portion 6 controls the radio portion 1 to send a signal assigning the newly set transmission rate to the base station 20. In response to the signal, the base station 20 sends the control signal at the newly set transmission rate. The processing from the step S104 to S111 is repeated until the transmission rate becomes appropriate.

As described hereinbefore, in the present invention, it is possible to quickly determine the optimal transmission rate by assigning a desired transmission rate to the base station after the initial value of transmission rate is set by detecting the receiving electric field level and controlling the transmission rate optimally on the basis of the bit error rate of the control signal from the base station. Therefore, it becomes possible to improve the efficiency of information management.

While the present invention has been described with reference to specific embodiments thereof, it will be appreciated by those skilled in the art that numerous variations, modifications and embodiments are possible, and, accordingly, all such variations, modifications and embodiments are to be regarded as being within the spirit and scope of the present invention.

What is claimed is:

1. A communication equipment with a transmission rate regulating function, comprising:

detection means for detecting an electric field level of a received radio signal transmitted from a remote station;

first assigning means for assigning an initial transmission rate for a control signal to be transmitted from the remote station, based on the electric field level detected by said detection means; and determination means for detecting a bit error rate of the control signal transmitted from the remote station and determining an optimal transmission rate by regulating the assigned initial transmission rate according to the detected bit error rate.

2. A communication equipment as claimed in claim 1, further comprising second assigning means for assigning the optimal transmission rate determined by said determination means to the remote station.

3. A communication equipment as claimed in claim 1, wherein said first assigning means determines the electric field level on the basis of a voltage value of the received signal.

4. A communication equipment as claimed in claim 1, wherein said determination means detects the bit error rate by using frame sync data of the control signal.

5. A radio communication equipment with a transmission rate regulating function, comprising:

receiving means for receiving a signal from a remote station;

first detection means for detecting an electric field level of the signal received by said receiving means;

second detection means for detecting a bit error rate of the signal received by said receiving means; and determination means for setting an initial transmission rate value based on the electric field level detected by said first detection means, and for determining a more preferable transmission rate value by regulating the initial transmission rate value according to the bit error rate detected by said second detection means.

6. A radio communication equipment as claimed in claim 5, further comprising assigning means for assigning the initial transmission rate value and the more preferable transmission rate value to the remote station.

7. A radio communication equipment as claimed in claim 6, wherein said second detection means detects the bit error rate from a signal received after said assigning means assigns the initial transmission rate value.

8. A radio communication equipment as claimed in claim 5, wherein the electric field level is detected as a voltage value.

9. A radio communication equipment as claimed in claim 5, further comprising:

a data terminal having a user interface function and managing a storage of data; and a modem for modulating and demodulating communication data teansmitted to and from the remote station.

10. A control method for regulating a signal transmission rate of a communication equipment, comprising the steps of:

detecting an electric field level of a radio signal received from a remote station;

assigning a transmission rate to a control signal from the remote station based on the electric field level detected in the detecting step;

detecting a bit error rate of the control signal transmitted from the remote station; and determining a more preferable transmission rate by regulating the assigned transmission rate according to the detected bit error rate.

11. A control method as claimed in claim 10, further comprising the step of assigning the determined more preferable transmission rate to the remote station.

12. A control method as claimed in claim 10, wherein the bit error rate is detected from frame sync data of the control signal.

13. A control method for regulating a signal transmission rate of a radio communication equipment, comprising the steps of:

receiving a signal transmitted from a remote station;

detecting an electric field level of the received signal;

detecting a bit error rate of the received signal;

setting an initial transmission rate value based on the detected electric field level; and determining a more preferable transmission rate value by regulating the initial transmission rate value according to the detected bit error rate.

14. A communication equipment as claimed in claim 1, wherein the radio signal is continuously transmitted from the remote station.

15. A communication equipment as claimed in claim 14, wherein the control signal is transmitted in response to an assignment of said initial transmission rate after the receipt of the radio signal.

* * * * *